Patented Jan. 22, 1946

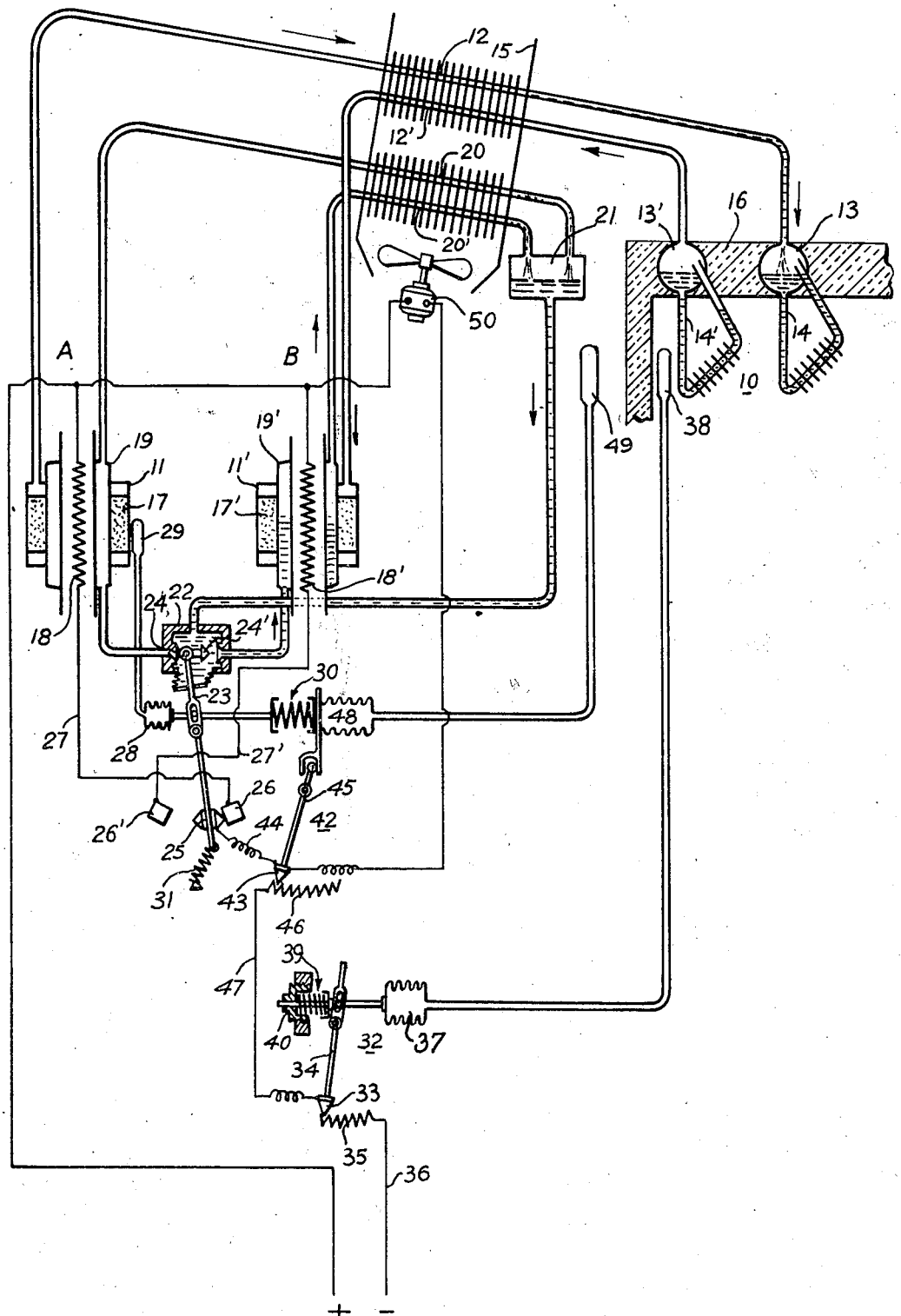

2,393,241

UNITED STATES PATENT OFFICE 2,393,241

INTERMITTENT ABSORPTION OR ADSORPTION REFRIGERATING APPARATUS

Nils Erland af Kleen, Stockholm, Sweden, assignor to Kleen Refrigerator, Inc., Hoboken, N. J., a corporation of Delaware Application June 12, 1942, Serial No. 446,806

11 Claims. (Cl. 62—5)

This invention relates to new and useful improvements in refrigerating apparatus of the intermittent absorption or adsorption type in which two or more units operate in phase relation to each other to provide substantially continuous refrigeration in a thermally insulated space or the like.

Although, for convenience, the invention will be described in connection with refrigeration of the absorption type, it is to be understood that the use of the expressions "absorb," "absorber," etc. in the following description and claims is intended to include the corresponding expressions for refrigeration of the adsorption type.

One of the primary objects of the present invention is to change the operation from generating to absorbing and vice versa of one and simultaneously change the operation from absorbing to generating and vice versa of another one of two or more intermittent type absorption refrigerating systems or units in accordance with the operating conditions of only one of said units.

Another object of the invention is to vary the rate of heat supply to each of two or more intermittent type absorption refrigerating units in accordance with the demands for refrigeration modified by changes in ambient air temperature and alternately to initiate the heat supply to one and simultaneously terminate the heat supply to another one of said units and to initiate the heat supply to the second unit and simultaneously terminate the heat supply to the first unit in accordance with the operating conditions of only one of said units.

The invention together with the objects and advantages thereof will be more fully developed in the following description in conjunction with the accompanying drawing in which the single figure illustrates diagrammatically a portion of a thermally insulated space cooled by two refrigerating units or systems of the intermittent absorption type operating in phase relation to each other in accordance with the present invention.

The two units shown in the drawing have been designated generally by the reference characters A and B, respectively, and each unit operates in phase relation to the other so that substantially continuous cold is produced in the thermally insulated space 10 which may comprise the storage compartment of a refrigerator cabinet. Inasmuch as the units shown are similar in all respects to one another, the different parts of unit B have been distinguished by the prime of the numerals employed to designate the corresponding parts of unit A.

Each unit consists of the usual boiler-absorber 11, 11' connected to supply refrigerant vapor to an air-cooled condenser 12, 12' and deliver refrigerant liquid to a receiver 13, 13' for passage into the cooling coil 14, 14' arranged in the space 10 to be cooled. Each condenser 12, 12' is arranged in a flue space 15 providing a natural draft of cooling air therefor and each receiver 13, 13' is preferably embedded in the top wall of the insulation 16 surrounding the space 10. Each boiler-absorber 11, 11' contains any suitable solid absorbent material 17, 17' capable of absorbing the refrigerant and of liberating such refrigerant upon application of heat from any suitable extraneous source such for example as the heating element 18, 18'. The absorption heat may be removed from each unit by any well known means, that shown comprising a secondary cooling system having jackets 19, 19' in heat exchange relation with the respective boiler-absorbers, air-cooled condensers 20, 20' arranged in the flue space 15, collecting vessel 21 and valve chamber 22 for the circulation of a heat transferring fluid in heat exchange relation with each boiler-absorber 11, 11'.

The alternate heating and cooling periods of each boiler-absorber are controlled by a thermostat mechanism including pivoted lever 23 movable from one operating position to another and vice versa and operatively connected at one end to a pair of oppositely disposed valves 24 and 24' in the valve chamber 22 and carrying at its opposite end a circuit-closing contact 25 adapted to cooperate with contacts 26 and 26', the former disposed adjacent one side of the lever 23 and connected by line 27 to the heating element 18 and the latter contact disposed adjacent the opposite side of said lever and connected by line 27' to the heating element 18'. Thus, when the lever 23 occupies one position, for example, that shown in the drawing, its contact 25 is in engagement with contact 26 to close the circuit to the heating element 18. In this position of the lever, valve 24 is closed while valve 24' is open so that boiler-absorber 11 is heated to liberate refrigerant vapor from the absorbent 17 and supply such refrigerant to the condenser 12 receiver 13 and cooling coil 14, while boiler-absorber 11' is cooled by the heat transferring system for the absorption of refrigerant evaporating in the cooling coil 14'.

The lever 23 is movable from the position shown in the drawing to its other operating position by a bellows 28 responsive to the temperature in the boiler-absorber of one of the units, for example, boiler-absorber 11 of unit A by means of thermostat bulb 29 and is movable from the second position back to the first position by any suitable spring device 30. A snap spring device 31 cooperates with the lever to permit movement of the latter from one operating position to the other and vice versa with a snap action, said device operating to maintain the lever normally in either of its operating positions. Thus, with the lever 23 occupying the position shown in the drawing, unit A is generating and unit B is absorbing and as the temperature in the boiler-absorber 11 rises under influence of the heat from the heater 18, the pressure in the bellows 28 will correspondingly increase until it overcomes the loading pressure of the spring device 30 when the lever will be moved with a snap action to its other position. In this position of the lever, unit A will absorb and unit B will generate and as the temperature in the boiler-absorber 11 will drop under influence of the heat removed by the heat transfer system, the pressure in the bellows 28 will correspondingly decrease until the pressure of the spring device 30 is sufficient to overcome the bellows pressure when the lever will be moved with a snap action to its first position.

The heat supplied to each unit is automatically regulated in accordance with the conditions in the space 10 by any suitable means such as a thermostat arrangement generally indicated as 32 and including contact 33 carried by a pivoted arm 34 and movable across a resistance coil 35, the latter connected by line 36 to the source of current. The contact 33 is movable from the end of the coil of relatively high resistance toward the end of relatively low resistance by a bellows 37 and thermostat bulb 38 in response to a rising temperature in the space 10. The bellows 37 operates against a spring loading device 39 which may be adjusted by threaded member 40 for any predetermined temperature condition desired to be maintained in the space 10. Thus, as the temperature rises in the space 10 above a predetermined level for which the thermostat has been set, the contact 33 will be moved a corresponding extent across the resistance coil 35 to increase the rate of heat supplied to the units and thereby increase the rate at which the refrigerant is liberated.

Inasmuch as the theoretical amount of refrigerant that can be utilized for refrigeration purposes in each system is fixed, it follows that by increasing and decreasing the rate of heat supply by the thermostat arrangement 32, the generating periods of each unit will be shortened and lengthened correspondingly.

However, as the lowest temperature that can be attained in each of the boiler-absorbers 11 and 11' by the air-cooled heat transfer system during the absorbing periods of the corresponding units varies directly with variations in ambient air temperature, the operating temperature range of each boiler-absorber to liberate the theoretical amount of refrigerant and to reabsorb such refrigerant during the generating and absorbing periods, respectively, of the associated unit will be on a decreasing scale with a rising ambient air temperature. Hence, as clearly disclosed in my co-pending application Serial No. 380,330, filed February 24, 1941, the maximum amount of heat that can be utilized to drive out the refrigerant is determined by the room air temperature. For this purpose, I have shown a second thermostat arrangement generally indicated as 42 and including a contact 43 connected by line 44 to contact 25 and carried by a pivotal arm 45 movable across a resistance coil 46 connected by line 47 to the movable contact 33 of rheostat arrangement 32. The contact 43 is movable across the resistance coil 46 from a point of low resistance to one of higher resistance by thermostat bellows 48 and bulb 49 in response to a rising room temperature above a predetermined level and thereby determines the maximum amount of heat controlled by the cabinet thermostat arrangement 32 as more fully described in my co-pending application above referred to.

As hereinbefore described, the movable member 23 of the thermostat control mechanism is movable from the position shown in the drawing to the other position by the bellows 28 to terminate the heating and initiate the cooling of boiler-absorber 11 and simultaneously to terminate the cooling and initiate the heating of boiler-absorber 11' and is movable from the second position back to the first position by the spring device 30 to terminate the heating and initiate the cooling of boiler-absorber 11' and simultaneously to terminate the cooling and initiate the heating of boiler-absorber 11 and inasmuch as the lowest temperature that can be attained in the boiler-absorbers by the air cooled transfer system is dependent upon and varies with the ambient air, the bellows 48 and thermostat bulb 49 or any other suitable thermostat means responsive to ambient air temperature may be employed to vary the loading pressure of the spring device 30. In this manner, the operation of both units is controlled in accordance with the temperature conditions in only one of the units and ambient air temperature by the thermostat device including means operating in response to a temperature condition in said one unit determined by ambient air temperature and attained during the generating period of said unit and operating in response to another temperature condition in said one unit determined by ambient air temperature and attained during the absorbing period of said unit.

As the cycling of the refrigerant is in accordance with the demands for refrigeration in the space 10 being cooled and as the condensation of the generated refrigerant vapors and the removal of absorption heat are effected by ambient air, it may be desirable to increase the flow of cooling air over the condensing parts in the flue space 15, especially with a rising ambient and, for this purpose, I have shown a motor-driven fan assembly 50 arranged in the lower part of the flue space 15.

While I have shown and described my invention in connection with an electrical heating system for the boiler-absorbers 11 and 11', the same may be employed to control the operation of two or more intermittent absorption systems operating in phase relation to each other and in which the boiler-absorbers are heated directly or indirectly by any other well known heating system employing gas or other fuel or fluid as the heat source. Moreover, the invention may also be applied to refrigerating systems of the intermittent absorption type in which the boiler-absorbers thereof are directly air-cooled instead of indirectly cooled by air as shown.

From the foregoing, it is believed that the operation and advantages of my invention may be readily understood by those skilled in the art without further description, it being borne in mind that numerous changes may be made in the details disclosed without departing from the spirit of the invention as set out in the following claims.

What I claim is:

1. Refrigeration apparatus including means forming a thermally insulated storage space, at least two refrigerating systems of the intermittent absorption type operating to cool said storage space, each system having a boiler-absorber adapted to be heated during the generating periods thereof and cooled during the absorbing periods thereof, heating means for each of said boiler-absorbers, an air-cooled vaporization-condensation heat transfer system for cooling each of said boiler-absorbers, valve means operable to control the circulation of the heat transferring medium in said heat transfer system, means for regulating the heat input to said boiler-absorbers in accordance with temperature changes in said storage space relative to ambient air temperature, and a thermostat device responsive to the temperature in only one of said boiler-absorbers and to ambient air temperature including means operable at a temperature attained during the heating period and another temperature attained during the cooling period of said one boiler-absorber and cooperating with said heating means and valve means to terminate the heating and initiate the cooling of said one boiler-absorber and simultaneously initiate the heating and terminate the cooling of the other boiler-absorber, and vice versa.

2. Refrigerating apparatus comprising two intermittent type absorption refrigerating units having alternate generating and absorbing periods and each including a boiler-absorber, heating means for said boiler-absorbers, and control mechanism for said heating means including a thermostat device acted upon by temperature change in the boiler-absorber of only one of said units and by change in ambient temperature constructed and arranged to terminate heating of the boiler-absorber of said unit and simultaneously initiate heating of the boiler-absorber of the other unit at a critical temperature determined by the ambient temperature and attained during the generating period of said unit and to initiate heating of the first boiler-absorber and terminate heating of the second boiler-absorber at another critical temperature determined by the ambient temperature and attained during the absorbing period of said unit.

3. Refrigerating apparatus comprising two intermittent type absorption refrigerating units having alternate generating and absorbing periods and each including a boiler-absorber, cooling means for said boiler-absorbers, and control mechanism for said cooling means including a thermostat device acted upon by temperature change in the boiler-absorber of only one of said units and by change in ambient temperature constructed and arranged to initiate cooling of the boiler-absorber of said unit and simultaneously terminate cooling of the boiler-absorber of the other unit at a critical temperature determined by the ambient temperature and attained during the generating period of said unit and to terminate cooling of said first boiler-absorber and simultaneously initiate cooling of the second boiler-absorber at another critical temperature determined by the ambient temperature and attained during the absorbing period of said unit.

4. Refrigerating apparatus comprising two intermittent type absorption refrigerating units having alternate generating and absorbing periods and each including a boiler-absorber, heating means for said boiler-absorbers, cooling means for said boiler-absorbers, and control mechanism for said heating means and cooling means including a thermostat device acted upon by temperature change in the boiler-absorber of only one of said units and by change in ambient temperature constructed and arranged to terminate heating and initiate cooling of the boiler-absorber of said unit and simultaneously terminate cooling and initiate heating of the boiler-absorber of the other unit at a critical temperature determined by the ambient temperature and attained during the generating period of said unit and to terminate cooling and initiate heating of the first boiler-absorber and simultaneously terminate heating and initiate cooling of the second boiler-absorber at another critical temperature determined by the ambient temperature and attained during the absorbing period of said unit.

5. Refrigerating apparatus comprising two intermittent type absorption refrigerating units having alternate generating and absorbing periods and each including a boiler-absorber and an evaporator, heating means for said boiler-absorbers, a thermostat device responsive to a temperature affected by said evaporators constructed and arranged to vary the heating rate of said heating means between a predetermined minimum and a variable maximum, a second thermostat device responsive to ambient temperature constructed and arranged to select the maximum heating rate of said heating means, and control mechanism including means acted upon by temperature change in the boiler-absorber of only one of said units and by change in ambient temperature constructed and arranged to terminate heating of the boiler-absorber of one and simultaneously initiate heating of the boiler-absorber of the other one of said units at a critical temperature determined by the ambient temperature and attained during the generating period of said unit and to initiate heating of the first boiler-absorber and simultaneously terminate heating of the second boiler-absorber at another critical temperature determined by the ambient temperature and attained during the absorbing period of said unit.

6. A refrigerator comprising a cabinet having a compartment to be cooled, a pair of intermittent type absorption refrigerating units having alternate generating and absorbing periods and each including a cooling element arranged in said compartment and a boiler-absorber arranged outside said compartment, heating means for said boiler-absorbers, cooling means for said boiler-absorbers, a thermostat device responsive to the temperature in said compartment constructed and arranged to vary the heating rate of said heating means between a predetermined minimum and a variable maximum, means for automatically selecting the maximum heating rate of said heating means in accordance with room temperature, and a second thermostat device responsive to a temperature affected by heating and cooling the boiler-absorber of only one of said units constructed and arranged to terminate heating and initiate cooling of the boiler-absorber of said unit and simultaneously terminate cooling and initiate heating of the boiler-absorber of the other unit at a critical temperature attained during the generating period of said unit and to terminate cooling and initiate heating of the first boiler-absorber and simultaneously terminate heating and initiate cooling of the second boiler-absorber at another critical temperature attained during the absorbing period of said unit.

7. In refrigerating apparatus including a plurality of intermittent type absorption refrigerating units having alternate generating and absorbing periods and each including a boiler-absorber, the combination of heating means for said boiler-absorbers, cooling means for said boiler-absorbers, and control mechanism for said heating means and cooling means including means movable from one operating position to another and vice versa to terminate heating and initiate cooling of one and simultaneously terminate cooling and initiate heating of another one of said boiler-absorbers and to terminate cooling and initiate heating of said first boiler-absorber and simultaneously terminate heating and initiate cooling of said second boiler-absorber, respectively, pressure operated means acted upon by temperature change effected by heating and cooling the boiler-absorber of only one of said units constructed and arranged to move said movable means from one to the other of said two named operating positions at a critical temperature attained during the generating period of said unit and to move said movable means from the second position to the first position at another critical temperature attained during the absorbing period of said unit, and a snap spring device cooperating with said movable means to normally maintain the latter in either one of said two named operating positions.

8. In refrigerating apparatus, the combination of a plurality of intermittent type absorption refrigerating units having alternate generating and absorbing periods, heating means for each of said units, and control mechanism for said heating means including means responsive to the conditions in only one of said units constructed and arranged to terminate the heat supply to one and simultaneously initiate the heat supply to another one of said units at one critical condition attained during the generating period of said one unit and to terminate the heat supply to the second unit and simultaneously initiate the heat supply to the first unit at another critical condition attained during the absorbing period of said one unit.

9. In refrigerating apparatus, the combination of two intermittent type absorption refrigerating units having alternate generating and absorbing periods and operating to cool a thermally insulated storage space or the like, heating means for each of said units, and control mechanism for said heating means including a thermostat device constructed and arranged to vary the heating rate of said heating means in accordance with temperature change in the space being cooled modified by change in ambient temperature, and a change-over device responsive to the conditions in only one of said units constructed and arranged to terminate the heat supply to one and simultaneously initiate the heat supply to the other one of said units at one critical condition attained during the generating period of said one unit and to terminate the heat supply to the second unit and simultaneously initiate the heat supply to the first unit at another critical condition attained during the absorbing period of said one unit.

10. In refrigerating apparatus including a plurality of intermittent absorption refrigerating units having alternate generating and absorbing periods and each including a boiler-absorber; the combination of heating means for each of said boiler-absorbers; cooling means for each of said boiler-absorbers; and control mechanism for said heating means and cooling means including a change-over device responsive to a condition affected by heating and cooling the boiler-absorber of only one of said units constructed and arranged to terminate heating and initiate cooling of the boiler-absorber of one of said units and simultaneously to terminate cooling and initiate heating of the boiler-absorber of another one of said units at a critical condition attained during the generating period of said one unit and to terminate cooling and initiate heating of the first boiler-absorber and simultaneously to terminate heating and initiate cooling of the second boiler-absorber at another critical condition attained during the absorbing period of said one unit.

11. In refrigerating apparatus including a plurality of intermittent absorption refrigerating units having alternate generating and absorbing periods and each including a boiler-absorber, a condenser arranged to be cooled by air, and an evaporator; the combination of heating means for each of said boiler-absorbers; cooling means for each of said boiler-absorbers including heat dissipating means arranged to be cooled by air; control mechanism for said heating means and cooling means including a change-over device responsive to a condition affected by heating and cooling the boiler-absorber of only one of said units constructed and arranged to terminate heating and initiate cooling of one of said boiler-absorbers and simultaneously to terminate cooling and initiate heating of another one of said boiler-absorbers at a critical condition attained during the generating period of said one unit and to terminate cooling and initiate heating of said first boiler-absorber and simultaneously to terminate heating and initiate cooling of said second boiler-absorber at another critical condition attained during the absorbing period of said one unit; and means constructed and arranged to vary the heating rate of said heating means for each of said units and the rate of flow of air over the condenser of each of said units and the heat dissipating means of said cooling means of each of said boiler-absorbers in accordance with change in a temperature affected by the evaporator of each unit and change in ambient air temperature.

NILS ERLAND AF KLEEN.